US007761313B1

(12) United States Patent
Brown et al.

(10) Patent No.: US 7,761,313 B1
(45) Date of Patent: Jul. 20, 2010

(54) SYSTEM AND METHOD FOR PROVIDING MULTIPLE REAL-TIME PRICING QUOTES BASED ON OPTIONAL CONSUMER VARIABLES

(75) Inventors: Kathy Lynne Brown, San Antonio, TX (US); Allen Bryant Lay, San Antonio, TX (US); Lisa Ott Baird, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1012 days.

(21) Appl. No.: 11/320,065

(22) Filed: Dec. 28, 2005

(51) Int. Cl.
*G06Q 40/00* (2006.01)
(52) U.S. Cl. .......................................................... 705/4
(58) Field of Classification Search .................. 705/4
See application file for complete search history.

(56) References Cited

U.S. PATENT DOCUMENTS

| 6,163,770 | A | 12/2000 | Gamble et al. | |
|---|---|---|---|---|
| 2002/0019778 | A1* | 2/2002 | Isaacson et al. | 705/26 |
| 2002/0188484 | A1* | 12/2002 | Grover et al. | 705/4 |
| 2004/0039611 | A1 | 2/2004 | Hong et al. | 705/4 |
| 2004/0128172 | A1 | 7/2004 | Van Cleave et al. | 705/4 |
| 2004/0143539 | A1* | 7/2004 | Penney et al. | 705/37 |
| 2006/0085452 | A1 | 4/2006 | Cope | |
| 2007/0061173 | A1 | 3/2007 | Gay | |
| 2007/0260494 | A1* | 11/2007 | Ogawa et al. | 705/4 |

OTHER PUBLICATIONS

Acord P&C XML, "A real-time upload initiative that allows agents to quote and issue new business policies for personal automobile and homeowners accounts," Donegal Insurance, IVANS, May 2003, 3 pages.
CGI Group Inc., "Comparative Rating for the Insurance Industry," 2004, 1-7.
E-Business Strategies, Inc., "Progressive Insurance: Creating Value via Mobile Field Service," Apr. 2003, 1-11.
Madigan, D., "Insurance Times: Making the most of the Internet Developing a realistic strategy for auto insurance sales," Apr. 3, 2001, xx(7), 4 pages.
"U.S. Appl. No. 11/320,069 , Notice of Allowance mailed Dec. 31, 2009", 7 pgs.
"U.S. Appl. No. 11/320,069, Final Office Action mailed Apr. 14, 2009", 14 pgs.
"U.S. Appl. No. 11/320,069, Non Final Office Action mailed Sep. 25, 2008", 11 pgs.

(Continued)

*Primary Examiner*—Jagdish N Patel
*Assistant Examiner*—Kevin Poe
(74) *Attorney, Agent, or Firm*—Schwegman, Lundberg & Woessner, P.A.

(57) ABSTRACT

A method and system for providing multiple real-time pricing quotes based on optional consumer variables is disclosed. A user accesses a web site and is provided with a web page enabling the user to choose a product with multiple optional features. Upon selection of the product and desired features, the user is provided with pricing information for the selected products and features and provided with the option to modify the product be selecting different features. Upon selection of the modification, the user is provided with a web page simultaneously displaying the original selection and associated feature prices and the modification and associated feature prices.

18 Claims, 5 Drawing Sheets

OTHER PUBLICATIONS

"U.S. Appl. No. 11/320,069, Notice of Allowance mailed Sep. 16, 2009", 15 pgs.

"U.S. Appl. No. 11/320,069, Response filed Jan. 23, 2009 to Non Final Office Action mailed Sep. 25, 2008", 12 pgs.

"U.S. Appl. No. 11/320,069, Response filed Jul. 14, 2009 to Final Office Action mailed Apr. 14, 2009", 14 pgs.

"U.S. Appl. No. 11/320,069, Response filed Dec. 16, 2009 to Final Office Action mailed Sep. 16, 2009", 8 pgs.

"U.S. Appl. No. 11/320,074, Final Office Action mailed Jan. 23, 2009", 9 pgs.

"U.S. Appl. No. 11/320,074, Non Final Office Action mailed Jul. 6, 2009", 5 pgs.

"U.S. Appl. No. 11/320,074, Non Final Office Action mailed Jul. 10, 2008", 8 pgs.

"U.S. Appl. No. 11/320,074, Non Final Office Action mailed Oct. 31, 2007", 11 pgs.

"U.S. Appl. No. 11/320,074, Response filed Feb. 29, 2008 to Non Final Office Action mailed Oct. 31, 2007", 18 pgs.

"U.S. Appl. No. 11/320,074, Response filed Apr. 23, 2009 to Final Office Action mailed Jan. 23, 2009", 13 pgs.

"U.S. Appl. No. 11/320,074, Response filed Nov. 6, 2009 to Non Final Office Action mailed Jul. 6, 2009", 11 pgs.

"U.S. Appl. No. 11/320,074, Response filed Nov. 10, 2008 to Non Final Office Action mailed Jul. 10, 2008", 13 pgs.

* cited by examiner

Quote to Insure a Vehicle                                   Need Help? Call 1-800-531-8111
Coverages for 2001 Ford Focus ZX3 Coupe 2-Door                                Step 4 of 5

Choose an option for your coverage:        ⦿ Use current coverages for this vehicle.
                                            ○ Customize coverages for this vehicle.

Current Coverages
For this quote, the following coverages have been applied from your policy to this vehicle.

| Coverage | Current Selection | Current Premium |
|---|---|---|
| Other Than Collision | $500 Deductible per occurence | $147.00 |
| Collision | $500 Deductible per occurence | $178.00 |
| Rental Reimbursement | $30/900 Limit per day/maximum | $12.00 |
| Towing & Labor | $120 | $6.00 |
| Liability & Other Coverages | Same as the other vehicle(s) on your policy View details | $186.73 |
| Charges required by your state | | $2.00 |
| Vehicle total | | $531.73 |

[ Previous ]  [ Cancel ]  [ Save ]  [ Next ]

*Fig. 3*

Replace a Vehicle                                          Need Help? Call 1-800-531-8111
Coverages for 2001 Ford Focus ZX3 Coupe 2-Door                                Step 4 of 6

Choose an option for your coverage:        ○ Use current coverages for this vehicle.
                                            ⦿ Customize coverages for this vehicle.

Customize Coverages
Please customize your coverage selections below. Your current selections are provided for comparision. If you would like to customize liability coverage, you will be given the option once this quote has been completed.

| Coverage | Current Selection | Current Premium | New Selection | New Premium |
|---|---|---|---|---|
| Other Than Collision | $500 Deductible per occurence | $147.00 | $ [500 ▼] Deductible per occurence | $147.00 |
| Collision Other Than Collision coverage must be selected to carry this coverage. | $500 Deductible per occurence | $178.00 | $ [500 ▼] Deductible per occurance | $178.00 |
| Rental Reimbursement Other Than Collision coverage must be selected to carry this coverage. | $30/900 Limit per day/maximum | $12.00 | $ [30/900 ▼] Limit per day/maximum | $12.00 |
| Towing & Labor | $120 | $6.00 | $ [120 ▼] | $6.00 |
| Liability & Other Coverages | Same as the other vehicle(s) on your policy View details | $186.73 | Same as the other vehicle(s) on your policy View details | $186.73 |
| Charges required by your state | | $2.00 | | $2.00 |
| Vehicle total | | $531.73 | [ Calculate ] | $531.73 |

*Fig. 4*      [ Previous ]  [ Cancel ]  [ Save ]  [ Next ]

| Product Feature Description | Current Selection | Current Price | New Selection | New Price |
|---|---|---|---|---|
| 121 | 123 | 125 | 127 | 129 |
| $f_1$ | $C_1$ | $CP_1$ | $C_1$ | $CP_1$ |
| $f_2$ | $C_2$ | $CP_2$ | $C_2$ | $CP_2$ |
| $f_n$ | $C_n$ | $CP_n$ | $C_n$ | $CP_n$ |
| $f_{n+1}$ | $CS_{n+1}$ | $CP_{n+1}$ | $V_1$ | $NP_1$ |
| $f_{n+2}$ | $CS_{n+2}$ | $CP_{n+2}$ | $V_2$ | $NP_2$ |
| $f_{n+m}$ | $CS_{n+m}$ | $CP_{n+m}$ | $V_m$ | $NP_m$ |
| Total | | CP total (133) | | NP Total (135) |

SYSTEM AND METHOD FOR PROVIDING MULTIPLE REAL-TIME PRICING QUOTES BASED ON OPTIONAL CONSUMER VARIABLES

CROSS REFERENCE TO RELATED APPLICATIONS

This application is related by subject matter to the following commonly assigned applications, the entirety of which are hereby incorporated by reference herein: U.S. Ser. No. 11/320,069, filed on Dec. 28, 2005, entitled SYSTEM AND METHOD FOR PROVIDING MULTIPLE REAL-TIME PRICING QUOTES BASED ON OPTIONAL CONSUMER VARIABLES; and U.S. Ser. No. 11/320,074, filed on Dec. 28, 2005, entitled SYSTEM AND METHOD FOR PROVIDING MULTIPLE REAL-TIME PRICING QUOTES BASED ON OPTIONAL CONSUMER VARIABLES.

TECHNOLOGY FIELD

The present system and method relates generally to electronic commerce systems and, more particularly, to a system and method of providing multiple real-time quotes for a product based on optional consumer variables.

BACKGROUND

Electronic commerce consists primarily of the distributing, buying, selling, marketing, and servicing of products or services over electronic systems such as the Internet and other computer networks.

To be successful, an electronic commerce site should provide an enjoyable and rewarding experience to its customers. To provide a positive customer experience some web sites include personalized web sites, purchase suggestions, and personalized special offers as a way of substituting for the face-to-face human interaction found at a traditional point of sale. Delivering value to the customer is another key component of successful electronic commerce web sites.

Another factor in making an electronic commerce web site user friendly is to minimize the amount of information necessary to develop a price quote. One such system and method is disclosed in published US application US 2004/0128172A1 (published Jul. 1, 2004) ('172 application) that is assigned to applicant. The '172 application discloses a system and method capable of providing an estimated premium without extensive and repetitive questioning. The system and method disclosed in the '172 application utilizes unique assumptions to dramatically reduce the amount of information that must be provided by the customer. Once logged onto the website the customer may choose to engage in a fast quote process which utilizes assumptions, driver information, and vehicle information to assess the risk associated with insuring the customer and then calculates an estimated cost to insure.

Electronic commerce has facilitated the recent marketing trend of mass customization. Mass customization is a way of building and selling products such that the product features are broken down and offered to the consumer as choices. For example, if a computer manufacturer has twenty or so product features that make up every computer (RAM, disk space, processor speed, modem, operating system, etc.), the customer can pick and choose between all twenty features, resulting in a computer that is customized to that particular customer's needs. This concept can be applied to the sale of goods such as appliances, clothes, automobiles, etc; and the sale of services such as insurance coverage.

One way that sellers of products cater to their customer is by providing customers with the ability to customize the products to best suit their needs and budget. For example, Dell Computers is well known for its build to order business model that allows a customer to specify the features of the computer that the customer wants to purchase. Dell has implemented electronic commerce as a means for extending the reach and scope of its direct sales business model at a low marginal cost. Dell has automated product configuration, order entry, and technical support functions. When a user visits the Dell web site the user can select from a menu of products to purchase (e.g. desktops, notebooks, televisions, etc.). If the user selects "desktops," the user is provided with a web page with a number of selections for desktop computers, (e.g. XPS PCs, Entertainment PCs, Basic PCs, etc.). If the user selects basic PCs the user is presented with a page listing a number of Basic PCs (e.g. Dimension 110 Basic High End, Dimension 110 Basic Mid Range, Dimension 110 Basic Core System, and Dimension 110 Entry Level PC), associated with each listing is a price and a specification. Also associated with each listing is a button (Customize It) that sends the user to another page that allows the user to select certain optional system components. Each optional system component has a price associated with it. Upon selection of the desired system components, the user is clicks on a "continue" button where the new price of the basic computer with the optional features is displayed. If the user wants to compare the prices between different combinations of components, the user has to enter the new combination and either print the results or note down the price for comparison. This arrangement does not provide the user with a simultaneous side by side display of prices for the first product selected and the customized product. Additionally the web site does not provide a breakdown display of the cost associated with each feature in the customized product. Also in the aforementioned site all users are presumed to be new purchasers, and no attempt is made to determine what the user's custom feature preferences are based on past purchasing habits.

Electronic commerce systems also exist where users can purchase insurance (e.g. auto insurance) One web site (Insure.com) provides the user with a comparison of premiums from different insurance companies. The user goes thorough an extensive on-line questionnaire and is prompted to select the types of coverage, limits and deductibles. A web page is the displayed listing a number of insurance companies and the rates that they would charge for the selected insurance. The web page provides the user with the ability to modify the coverages by clicking on a "modify coverages button." The user is then transferred to another web page where the user is prompted to enter the modified coverage information. One that is entered the user clicks on a "yes give me a rate" button and is displayed a web page listing the insurance companies and the premiums for the modified coverages. This arrangement does not provide the user with the ability to easily add a new vehicle to existing coverage with an insurance company. The Insure.com web site also fails to provide the user with a simultaneous display of the premiums for the first selected coverage and the modified coverage. Finally, the web site fails to provide the user with a breakdown of the prices of the features of the first coverage selected and the modified coverage.

There is a need to provide an online system that provides the user with a convenient way to compare the prices of a product and a customized product.

There is a need to provide a repeat customer with the capability to purchase new products without having to input repetitive data and preferences that are already in the possession of the seller.

There is a need to provide on-line real time quoting tools that provide the user with a convenient way to compare prices for products based on optional variables selected by the consumer, in a single screen.

There is a need to provide on-line purchasing tools that recognize established customers and provide established customers with a convenient way to receive price quotes without having to input information that is already available to the web site operator.

In web sites that offer insurance products, there is a need to provide a simple interface to facilitate adding coverage to a new vehicle to an insurance policy and providing an immediate premium quote.

In web sites that offer insurance products, there is a need to provide the user with the ability to customize the coverage for the new vehicle and provide a convenient way to compare the premiums for the first coverage selected and the customized coverage.

SUMMARY

Accordingly, an embodiment of a method in this disclosure provides pricing information to a user for a product with a plurality of optional features by first calculating a first price for the product based on a first subset of optional features and providing the ability to select a second subset of optional features. Subsequently a second price for the product based on the second subset of optional features is calculated and simultaneously displayed with the first price. This feature allows the user to conveniently compare the prices for the different embodiments of the product and the cost impact of the feature selection.

An embodiment of a system in this disclosure includes a server accessible to a user that provides multiple real time pricing quotes or a desired product based on optional features for the product. The system also includes software for selecting the desired product with optional features and software for selecting a product with different optional features. Also included is software for simultaneously displaying the prices for the selected products and associated features. This provides the user with the convenience of being able to compare the price impact of the features available.

The disclosure also includes a computer readable medium for performing a process for providing multiple real-time pricing quotes based on optional consumer variables. The computer readable medium includes means for generating a web page having a list of products to be offered for sale. The medium also provides a mechanism for selecting a desired product with a first optional features. A second web page is generated by the computer readable medium that displays the prices for each of optional feature and provides the user an option to customize the desired product by selecting different optional features. The computer readable medium provides a way of generating a third web page having a listing of the optional features and associated prices and a listing of the modified features and associated prices.

BRIEF DESCRIPTION OF THE DRAWINGS

A more complete appreciation of the various embodiments and many of the attendant advantages thereof will be readily obtained as the same becomes better understood by reference to the following detailed description when considered in connection with the accompanying drawing; it being understood that the drawings contained herein are not necessarily drawn to scale; wherein:

FIG. 3 is an illustration of a web page generated by the system.

FIG. 4 is an illustration of a second web page generated by the system.

FIG. 6 is a schematic of a web page layout generated by a system for providing multiple real-time pricing quotes based on optional consumer variables.

DETAILED DESCRIPTION OF ILLUSTRATIVE EMBODIMENTS

Figure 1:
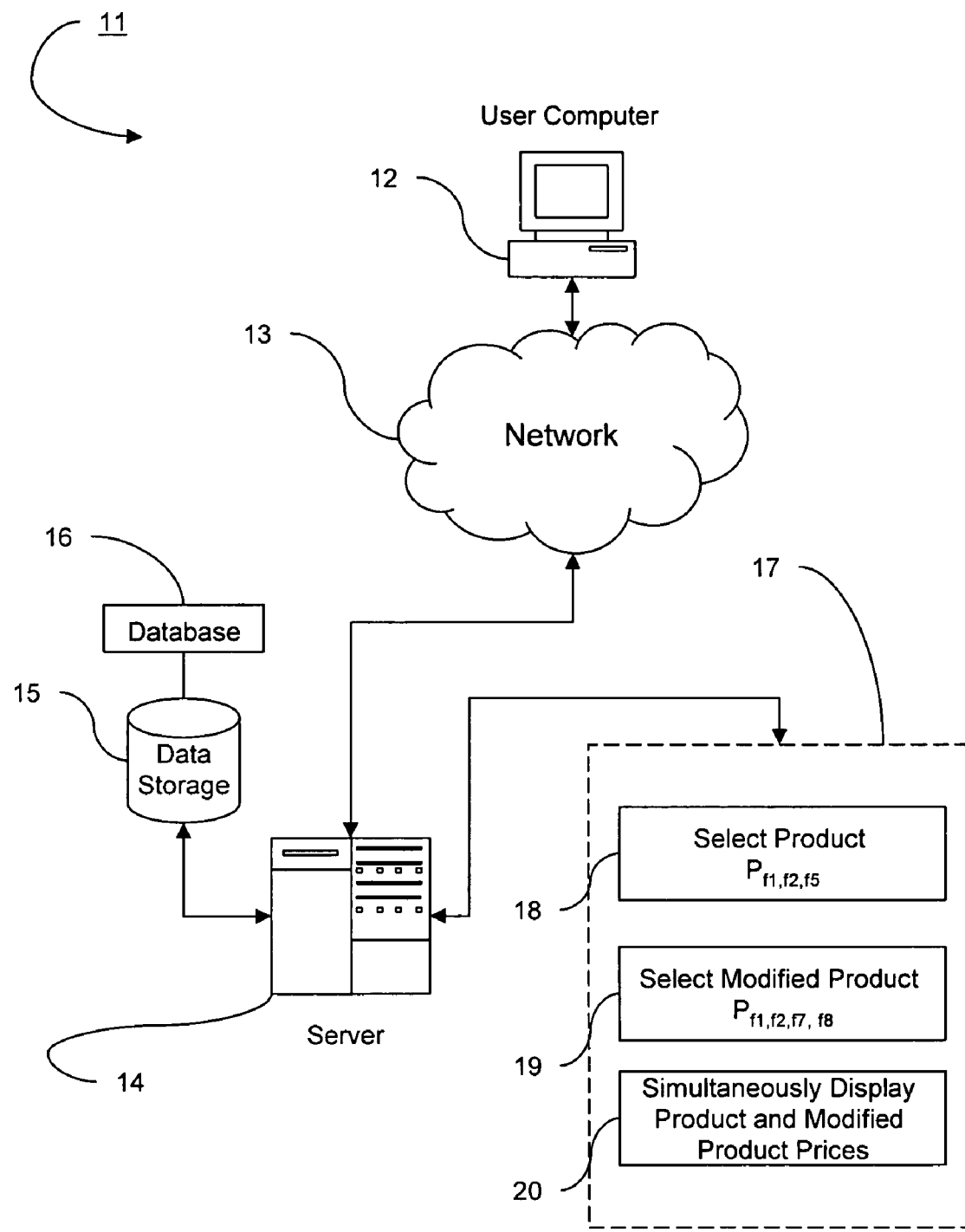
FIG. 1 illustrates the system for providing multiple real-time pricing quotes based on optional consumer variables.

FIG. 1 illustrates a system 11 for providing multiple pricing quotes based on optional consumer variables. In the embodiment of FIG. 1, the system 11 comprises a user computer 12 connected through a network 13 (e.g. the interne) to a second computer 14 capable of managing the customer's interaction with the system. The user computer 12 may be a personal computer and the second computer 14 may be a server or mainframe computer. Associated with the second computer 14 is a memory device 15 that includes a database 16 of existing customers, products previously purchased by the customers, and features of those products. The database may include a plurality of records including fields for Customer, Customer ID, Products purchased by customer and product features on products purchased by customers.

Also associated with second computer 14 are software programs 17. The software programs 17 provides the functionality that assists the user with navigation of the site and the ability to obtain a real time quote for the product and compare prices for optional features. In a preferred embodiment, the software programs may be Java Server Pages (JSPs). JSPs are small programs that run on a server (e.g. second computer 14) that are designed to be executed from within another application. Included in the software programs 17 is a product selection program 18 that enables the user to select a product having certain optional features. In FIG. 1, the Product is illustrated as having optional features $f_1$, $f_2$ and $f_5$. Also included in software programs 17 is a product modification program 19 that enables the user to select different features for the product. In FIG. 1, the different features are designated as $f_1$, $f_2$, $f_7$ and $f_8$. Software programs 23 also includes a program 20 that simultaneously displays the prices for the features of the first product and the features for the modified products. This enables a user to make an informed decision when purchasing a product with multiple optional features.

The system 11 may be used to provide or sell on-line any group of products having optional features. For example, if the system 11 was operated by a computer vendor, the products may be computers with optional features such as different types of peripherals, or internal components. The user would have the option to select a computer with a first set of features $f_1$ (basic desktop), $f_2$ (15" flat panel display) and $f_5$ (40 GB hard drive). The user would be able to customize the computer with a second set of features $f_1$ (basic desktop), $f_2$ (15" flat panel display), $f_7$ (80 GB hard drive) and $f_8$ (Single Drive: 16× CD/DVD burner (DVD+/−RW) w/double layer write capability). Program 20 would return a web page with the pricing for both computers with a breakdown of the price for each selected feature.

System 11 may be used to provide insurance (e.g. automobile insurance). In that case, the product may be insurance coverage for an automobile. The user would have the option to select insurance coverage for a specific automobile with a first set of features $f_1$ ($500 deductible per occurrence for coverage other than collision), $f_2$ ($500 deductible per occurrence for collision coverage) and $f_5$ ($30/900 limit per day/maximum for rental reimbursement). The user would be able to customize the coverage with a second set of features $f_1$ ($500 deductible per occurrence for coverage other than collision), $f_2$ ($500 deductible per occurrence for collision coverage), $f_7$ ($60/1,800 limit per day/maximum for rental reimbursement) and $f_8$ ($240 towing and labor coverage). Program 20 would return a web page with the pricing for both coverages with a breakdown of the price for each selected feature. The user can then select the insurance coverage that in the user's judgment provides the best value to the user. Additional features of the programs 17 will become apparent from the description of the process implemented by the system 11.

Figure 2:
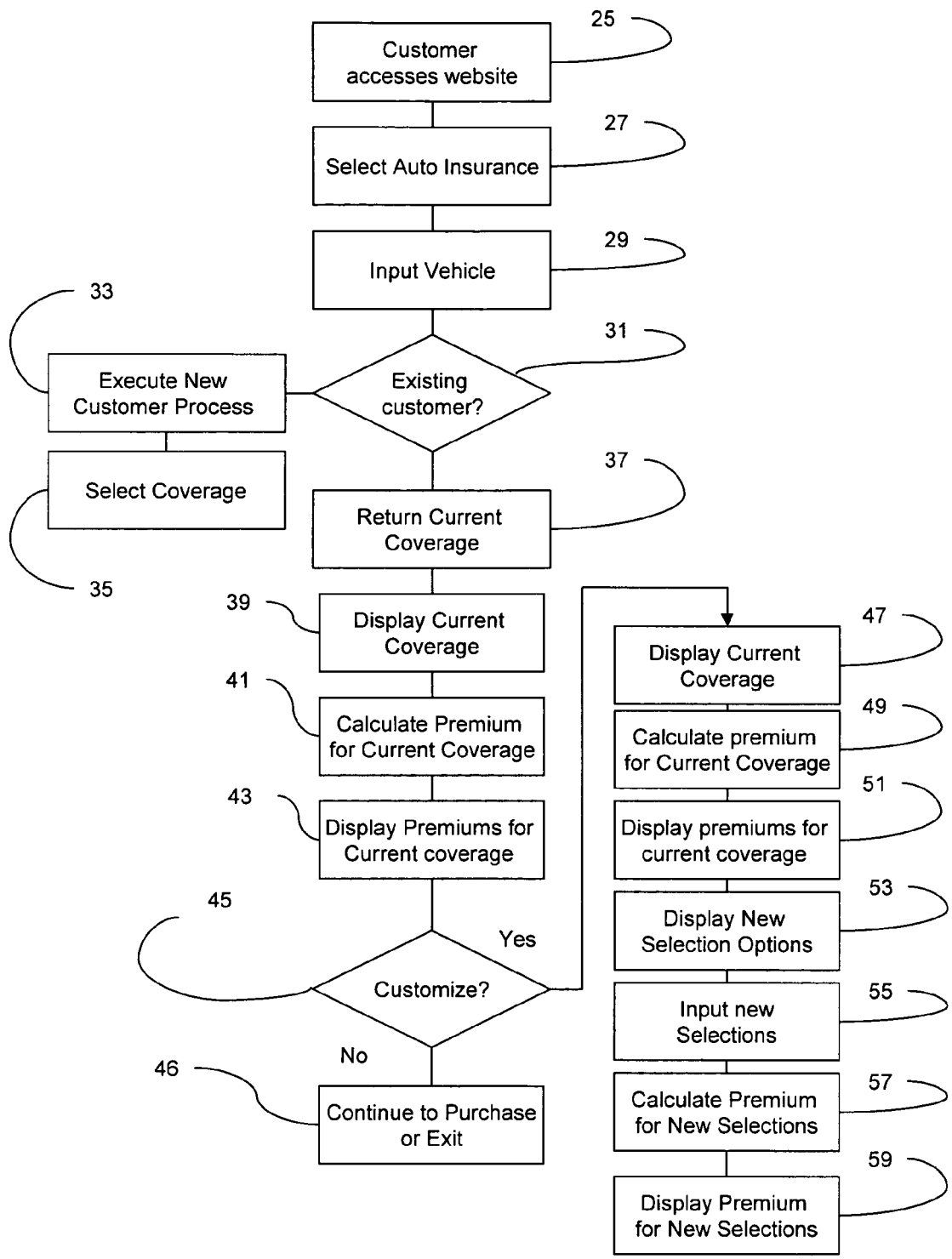
FIG. 2 is a process flow diagram of a method of providing multiple real-time premium quotes based on coverage selection.

Illustrated in FIG. 2 is an embodiment of a process that may be implemented by the software programs 17 in an insurance application. The user would connect to the internet using user computer 12 and access the insurance company web site (step 25). The user would be presented with a web page that includes an option to select auto insurance (step 27). The user may then be requested to input information about the vehicle for which the user may want to purchase coverage (step 29). The system would then query the database to determine if the customer had previously purchased automobile insurance from the company. If the customer is a new customer then the system would execute a new customer process that would query the user about the information needed to issue a new policy (step 33). The user would then be guided through a series of questions to help in the selection of the coverage (including type, limits and deductibles (step 35).

If the customer already has coverage for another vehicle, the system would return the current coverage for the other vehicle (step 37) and provide a web page listing the types of coverage for the new vehicle, the coverage limits and deductibles and the premiums for the coverage for the new vehicle (steps 39, 41 and 43). Although the steps 39, 41 and 43 are listed as separate steps, the information developed in those steps would be returned to the user as a single web page. FIG. 3 is an illustrative example of the web page returned after completion of step 43. The system would then offer the user the option to customize the coverage (step 45). If the user declines to customize the coverage, the system would provide the user the option to purchase the coverage or exit to another process (step 46).

If the user decides to customize the coverage the system would display the current coverage, (step 47) calculate the premiums for the current coverage (step 49), and display the premiums for the current coverage (step 51). Additionally the system would display a set of new selection options that allow input from the user (step 53). The new selection options may be in the form of a drop down menu, check boxes or buttons. The user would input a selection for the type of coverage, limits and deductibles (step 55). The system would simultaneously calculate the new premiums for the selection options (step 57) and display the new premiums adjacent to the premiums for the old selection (step 59). FIG. 4 illustrates the resulting web page. In the resulting web page, the user can compare the prices of the old and new coverage, and the effect a change of coverage has on the overall total costs. This allows a user to receive a quicker premium and better decision support on which coverages they will choose for their new vehicle.

Figure 5:
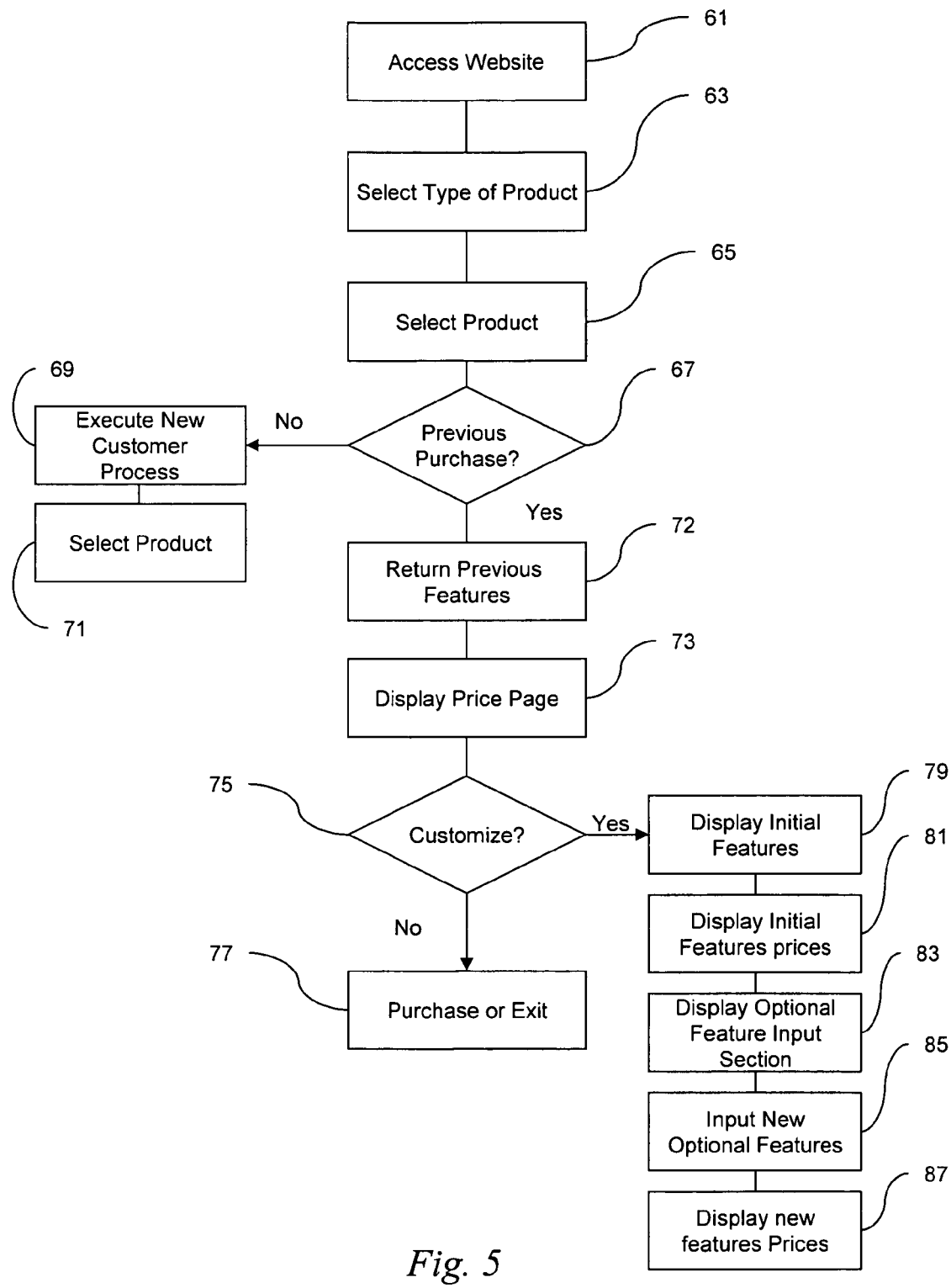
FIG. 5 is a process flow diagram of a method of providing multiple real-time price quotes based on product feature selections.

Illustrated in FIG. 5 is another embodiment of a process that may be implemented by the software programs 17. To explain the process an example relating to the purchase of computers is used. The product is a basic desktop computer having a set of optional features. For the purpose of this example, the optional features may include two types of memory, a floppy disk drive, and three speakers.

In the first step 61 the user accesses a web site operated by (or for) the computer seller. The user is provided with a menu where the type of product may be selected (step 63) (e.g. laptop, desktop, television). The user is then provided with a choice of products and selects a product in step 65 (e.g. a Dimension 110 Entry Level PC). The system then searches the database 21 to determine if the user has purchased a similar product previously. If the user has purchased a similar product previously, the system would return a web page indicating the latest version of the PC that had been purchased previously, the features associated with the previous PC (e.g. floppy disk drive, additional memory, etc.) and the prices associated with the new version of the Dimension 110 Entry Level PC and the selected features as well as a total price (steps 72 and 73). At that point, the user would be given the option to customize (i.e. select additional available features) the PC (step 75). If the user chooses not to get information about additional features, the user would be given the option to purchase the PC or exit without purchasing (step 77). If the user elects to customize the PC, the system would return a web page that displays the initial features (step 79) the prices for the initial features (step 81), a user interface capability to input or select new features (step 83) and when the user selects new features (step 85) the prices for the selected new features (step 87).

FIG. 6 illustrates the layout and information components that result from a preferred embodiment of the present method. The display includes a product feature description column 121, a current selection column 123, a current price column 125, a new selection column 127 and a new price column 129. For a product P there may be a plurality of constant features $f_1$ to $f_n$ that may not be varied by the user. In those cases, the selection is a constant $C_1$ to $C_n$. The product P may also have a plurality of features, $f_{n+1}$ to $f_m$ that the user may vary by inputting a variable selection $V_1$ to $V_m$ in the input interfaces 131. Associated with each variable feature selection V is a price NP.

It should be understood that the present embodiments may utilize any number of hardware components and that the present embodiments is not limited to those explicitly described herein.

Although the system and method have been described with reference to specific embodiments, this description is not meant to be construed in a limited sense. Various modifications of the disclosed embodiments, as well as alternative embodiments of the system and method, will become apparent to persons skilled in the art upon reference to the description of the embodiments disclosed herein. It is, therefore, contemplated that the appended claims will cover such modifications that fall within the scope of the various embodiments.

What is claimed is:

1. A method comprising:
   using one or more processors to perform the following:
   receiving a first selection of a product:

determining whether a user associated with the first selection has purchased a previous product similar to the product based on receipt of the first selection;

providing the user with an option to select a first set of product features of the product to include at least some product features of the previous product based on a determination that the user has purchased the previous product similar to the product;

receiving an acceptance of the option;

calculating a first price for the product based on a first set of product features in response to the receiving of the acceptance;

receiving a second selection of a second set of product features for the product, the second set of product features including at least one different product feature than the first set of product features;

calculating a second price for the product based on the second set of product features of the product based on the receiving of the second selection, the second set of product features including at least one different feature than the first set of product features; and simultaneously displaying the first price for the product and the second price for the product.

2. The method of claim 1, further comprising:

providing a user interface to select the second set of product features, wherein the receiving of the second selection is based on the providing of the user interface.

3. The method of claim 1, wherein the product includes automobile insurance and the first set of product features include insurance limits and deductibles.

4. The method of claim 3, wherein the previous product includes an existing insurance policy for a vehicle.

5. The method of claim 4, wherein the product includes a new insurance policy for another vehicle.

6. The method of claim 1, further comprising:

displaying a price comparison table with a first column listing a plurality of available features of the product, the plurality of available features including the first set of product features and the second set of product features, a second column listing a feature price of each product feature of the first set of the first set of product features, and a third column listing the feature price of each product feature of the second set of product features.

7. A system for providing pricing information to a consumer from a seller for a product having a plurality of optional features comprising:

a memory having software stored thereon; and a programmable processor communicatively coupled to the memory, wherein the software when executed by the programmable processor causes the programmable processor to:

receives receive a first selection of a product;

determines determine whether a user associated with the first selection has purchased a previous product similar to the product based on receipt of the first selection;

provide the user with an option to select a first set of product features of the product to include at least some product features of the previous product based on a determination that the user has purchased the previous product similar to the product;

receive an acceptance of the option;

calculate a first price for the product based on a first set of product features in response to receiving of the acceptance;

receive a second selection of a second set of product features for the product, the second set of product features including at least one different product feature than the first set of product features;

calculate a second price for the product based on the second set of product features of the product based on receiving of the second selection, the second set of product features including at least one different feature than the first set of product features; and simultaneously display the first price for the product and the second price for the product.

8. The system of claim 7, wherein the software when executed by the programmable processor causes the programmable processor to:

provide a user interface to select the second set of product features, wherein receiving the second selection is based on providing the user interface.

9. The system of claim 7, wherein the product includes automobile insurance and the first set of product features include insurance limits and deductibles.

10. The system of claim 7, wherein the previous product includes an existing insurance policy for a vehicle.

11. The system of claim 10, wherein the product includes a new insurance policy for another vehicle.

12. The system of claim 7, wherein the software when executed by the programmable processor causes the programmable processor to:

display a price comparison table with a first column listing a plurality of available features of the product, the plurality of available features including the first set of product features and the second set of product features, a second column listing a feature price of each product feature of the first set of the first set of product features, and a third column listing the feature price of each product feature of the second set of product features.

13. A non-transitory computer-readable medium comprising computer-readable instructions for providing pricing information to a consumer from a seller for a product having a plurality of optional features, said non-transitory computer-readable medium instructions when executed by a computer, cause the computer to:

receive a first selection of a product;

determine whether a user associated with the first selection has purchased a previous product similar to the product based on receipt of the first selection;

provide the user with an option to select a first set of product features of the product to include at least some product features of the previous product based on a determination that the user has purchased the previous product similar to the product;

receive an acceptance of the option;

calculate a first price for the product based on a first set of optional product features in response to receipt of the acceptance;

receive a second selection of a second set of product features for the product, the second set of product features including at least one different product feature than the first set of product features;

calculate a second price for the product based on the second set of product features of the product based on the receiving of the second selection, the second set of product features including at least one different feature than the first set of product features; and simultaneously display the first price for the product and the second price for the product.

14. The non-transitory computer-readable medium of claim 13, further comprising instructions, which when executed by a computer, cause the computer to:
provide a user interface for indicating to select the set of product features,
wherein the receiving of the second selection is based on the providing of the user interface.

15. The non-transitory computer-readable medium of claim 13, wherein product includes automobile insurance and the first set of product features include insurance limits and deductibles.

16. The non-transitory computer-readable medium of claim 15, the previous product includes an existing insurance policy for a vehicle.

17. The non-transitory computer-readable medium of claim 16, wherein the product includes a new insurance policy for another vehicle.

18. The non-transitory computer readable medium of claim 13, further comprising instructions, which when executed by a computer, cause the computer to:
display a price comparison table with a first column listing a plurality of available features of the product, the plurality of available features including the first set of product features and the second set of product features, a second column listing a feature price of each product feature of the first set of the first set of product features, and a third column listing the feature price of each product feature of the second set of product features.

* * * * *

UNITED STATES PATENT AND TRADEMARK OFFICE
CERTIFICATE OF CORRECTION

| | | |
|---|---|---|
| PATENT NO. | : 7,761,313 B1 | Page 1 of 1 |
| APPLICATION NO. | : 11/320065 | |
| DATED | : July 20, 2010 | |
| INVENTOR(S) | : Kathy L. Brown et al. | |

It is certified that error appears in the above-identified patent and that said Letters Patent is hereby corrected as shown below:

In column 7, line 54, in Claim 7, delete "receives receive" and insert -- receive --, therefor.

In column 7, line 55, in Claim 7, delete "determines determine" and insert -- determine --, therefor.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,761,313 B1 |
| APPLICATION NO. | : 11/320065 |
| DATED | : July 20, 2010 |
| INVENTOR(S) | : Kathy L. Brown et al. |

It is certified that error appears in the above-identified patent and that said Letters Patent is hereby corrected as shown below:

In column 6, line 67, in Claim 1, delete "receiving a first selection of a product:" and insert -- receiving a first selection of a product; --, therefor.

In column 7, line 43, in Claim 6, delete "set of the first set" and insert -- set --, therefor.

In column 8, line 34, in Claim 12, delete "set of the first set" and insert -- set --, therefor.

In column 9, line 3, in Claim 14, delete "a" and insert -- the --, therefor.

In column 9, line 4, in Claim 14, after "interface" delete "for indicating".

In column 9, line 10, in Claim 15, delete "wherein" and insert -- wherein the --, therefor.

In column 9, line 14, in Claim 16, delete "the" and insert -- wherein the --, therefor.

In column 10, line 4, in Claim 18, delete "computer readable" and insert -- computer-readable --, therefor.

In column 10, line 6, in Claim 18, delete "a" and insert -- the --, therefor.

In column 10, line 12, in Claim 18, delete "set of the first set" and insert -- set --, therefor.

Signed and Sealed this
Twenty-second Day of March, 2011

David J. Kappos
*Director of the United States Patent and Trademark Office*